US012791742B2

(12) United States Patent
Chang et al.

(10) Patent No.: US 12,791,742 B2
(45) Date of Patent: Nov. 10, 2026

(54) RADIATION SENSORS FOR DEEP SPACE ENVIRONMENT

(71) Applicant: National Central University, Taoyuan City (TW)

(72) Inventors: Loren Cheewei Chang, Taoyuan City (TW); Wei-Yi Lin, Taoyuan City (TW); Yi-Hsuan Chou, Taoyuan City (TW); Kai-Jie Hou, Taoyuan City (TW); Jen-Siang Lin, Taoyuan City (TW); Chieh Lung, Taoyuan City (TW); Hui-Hui Chou, Taoyuan City (TW); Glenn Franco Barroso Gacal, Taguig City (PH); Yu-Shun Wang, Taoyuan City (TW); Tzu-Wei Hung, Taoyuan City (TW); I Chen, Taoyuan City (TW); Shih-Pin Lee, Taoyuan City (TW); Yi-Chung Chiu, Taoyuan City (TW)

(73) Assignee: NATIONAL CENTRAL UNIVERSITY, Taoyuan City (TW)

( * ) Notice: Subject to any disclaimer, the term of this patent is extended or adjusted under 35 U.S.C. 154(b) by 169 days.

(21) Appl. No.: 19/015,287

(22) Filed: Jan. 9, 2025

(65) Prior Publication Data

US 2025/0298159 A1 Sep. 25, 2025

Related U.S. Application Data

(60) Provisional application No. 63/567,653, filed on Mar. 20, 2024.

(51) Int. Cl.
*G01T 1/24* (2006.01)
*G01T 1/02* (2006.01)

(52) U.S. Cl.
CPC .............. *G01T 1/244* (2013.01); *G01T 1/026* (2013.01); *G01T 1/245* (2013.01)

(58) Field of Classification Search
None
See application file for complete search history.

(56) References Cited

U.S. PATENT DOCUMENTS 9,468,406 B2 10/2016 Dieckmann
2006/0186342 A1 8/2006 Burger et al.
(Continued)

FOREIGN PATENT DOCUMENTS

CN 111948701 11/2020
CN 112649832 4/2021
(Continued)

OTHER PUBLICATIONS

Taiwan Patent Office "First Office Action & Search Report" issued on Aug. 6, 2025, Taiwan.
(Continued)

*Primary Examiner* — Marcus H Taningco
(74) *Attorney, Agent, or Firm* — WPAT, PC

(57) ABSTRACT

The present application provides a radiation sensor for deep space environments, comprising a circuit board; a payload control module, disposed on the circuit board; a radiation sensitive field-effect transistor readout module, also disposed on the circuit board and electrically connected to the payload control module; flash memory, disposed on the circuit board and electrically connected to both the payload control module and the radiation sensitive field-effect transistor readout module. The flash memory includes a detection software, which, upon detecting a single event upset in at least one bit of the stored sensor data, immediately identifies and records the position of the affected bit. The
(Continued)

1 detection software then resets the data affected by the single event upset and records the number of bit errors.

10 Claims, 12 Drawing Sheets

(56) References Cited

U.S. PATENT DOCUMENTS

| | | | | |
|---|---|---|---|---|
| 2012/0084628 | A1* | 4/2012 | Cox | G06F 11/1048 714/763 |
| 2023/0019822 | A1* | 1/2023 | Preston | G01T 1/245 |
| 2023/0170038 | A1 | 6/2023 | Alacchi | |

FOREIGN PATENT DOCUMENTS

| | | | |
|---|---|---|---|
| CN | 113012749 | | 6/2021 |
| CN | 113899396 | A | 1/2022 |
| CN | 116153380 | A | 5/2023 |
| CN | 116467183 | | 7/2023 |
| EP | 3036564 | B1 | 10/2018 |
| JP | H06227499 | | 8/1994 |
| JP | 2008282516 | | 11/2008 |
| TW | M668485 | | 4/2025 |
| WO | WO2015024591 | A1 | 2/2015 |

OTHER PUBLICATIONS

Straube et al. "The ESA Active Dosimeter (EAD) system onboard the International Space Station (ISS)". May 23, 2022, Elsevier GmbH.

Christoph Tscherne et al., Development of a Miniaturized Reference Dosimeter Payload for SmallSat Applications, 2021, IEEE.

Preeti Kumari et al., Wireless Passive Radiation Dosimeter Using Flash Memory, 2018, IEEE.

Erik Kerstel et al., Nanobob a Cubesat Mission Concept For Quantum Communication Experiments in an Uplink Configuration, Nov. 10, 2017.

Francisco J. Franco et al., A Portable Low-Cost SEU Evaluation Board for SRAMs, 2007, IEEE.

Stefan Gohl et al., Study of the radiation fields in LEO with the Space Application of Timepix Radiation Monitor (SATRAM), 2018, COSPAR.

Combination EPO Extended European Search Report for P013-2457902EP and JPO Notice of Allowance for P012-2457902JP (combined official office action for EP patent application and JP patent application). Corresponding European patent application on Jul. 3, 2025 Corresponding Japanese patent application on Feb. 3, 2026.

* cited by examiner

RADIATION SENSORS FOR DEEP SPACE ENVIRONMENT

FIELD OF THE INVENTION

The present application relates to a radiation sensor for a deep space environment, particularly a radiation sensor for a deep space environment with capable of surviving high-intensity radiation, high-energy particles, extreme temperatures, heavy mechanical loads, and severe vibrations.

BACKGROUND OF THE INVENTION

Deep space exploration refers to space exploration missions executed away from the low Earth orbit, below 2000 kilometers altitude, and entering high Earth orbit, interplanetary space, and cislunar space, typically involving the exploration of the Moon and other celestial bodies beyond the Moon. Deep space environments are significantly different from near-Earth orbit environments, with longer exploration periods in deep space, potentially exposing deep space sensors to space conditions in a deep space orbit worse than the space conditions in a near-Earth orbit.

The deep space environment is filled with high-energy radiation fields, impacts from solar energetic particles (SEP), photons, galactic cosmic rays (GCR), high-density high-energy plasma from coronal mass ejections, and induced radiation fields on celestial surfaces, all of which may degrade or even disable the performance of function materials and components in deep space sensors, and may cause physiological responses on astronauts such as cataracts, neurological disorders, and decreased immunity.

In the deep space environments, ionizing radiation poses a major hazard to the safety of sensors and astronauts during space travel. Due to the deep space environments extending outside of the Earth's magnetosphere and the lack of the protection of the Earth's magnetic field and atmosphere, the deep space environments are subject to high fluxes of ionizing electromagnetic and particle radiation. The ionizing radiation environment may be divided into three domains based on the sensor's flight in the deep space environments: First, the space radiation environment during the journey from Earth to other planets, primarily due to solar energetic particles and galactic cosmic rays; Second, the radiation environment during the sensor's descent onto deep space celestial bodies, mainly from solar energetic particles and galactic cosmic rays captured by the celestial magnetic fields; Third, the radiation environment on the surface of deep space celestial bodies where the sensors land, primarily consisting of secondary radiation produced after the celestial bodies absorb cosmic radiation, mainly composed of high-energy and heavy particles.

Astronauts are exposed to radiation doses from deep space environments within their bodies, and the longer they stay in deep space radiation environments, the greater the impact. Absorption of high-energy particles, photons, and cosmic rays damage astronauts' cells, cause DNA mutations, and increase the risk of cancer, due to exposure leading to the destruction the molecular structures within most organisms. Radiation may penetrate living tissues, causing short-term or long-term damage to bone marrow stem cells, leading to chromosomal abnormalities in lymphocytes, which are central to the immune system and if damaged, may lead to degraded immunity to viruses previously suppressed in the body. Additionally, T cells in lymphocytes are less likely to regenerate correctly in space, and even if they do regenerate, they struggle to resist infections. Thus, astronauts' ability to resist diseases decreases, and in the confined space of the spacecraft, the disease infection risk among crew members is also increased.

The sensors will encounter high-energy charged particle radiation from solar energetic particles and galactic cosmic rays in the deep space environment, as well as high energy solar electromagnetic radiation. When the sensors operate near planetary bodies and their satellites, they may also be subjected to low-energy charged particle radiation from induced radiation belts and neutron radiation on the surface of the celestial bodies. The severe radiation environments of deep space will cause more severe degradation effects on the sensitive materials and components of the sensors compared to the degradation effects in Low Earth Orbit. Under prolonged exposure to deep space radiation environments, the performance of sensitive materials such as thermal control materials, solar cells, optical materials, insulating materials, and sealing materials in the sensors will severely degrade, including degradations in optical, electrical, and mechanical properties, as well as degradations in insulation and sealing capabilities; electronic components will also encounter single event effects and total ionizing dose effects.

Single Event Effects (SEE) refer to a series of anomalous effects caused by high-energy charged particles passing through microelectronic components, causing abnormal changes or damage to the component's logic state or functionality due to the charges collected by electrodes of the sensitive component. SEEs may alter the logic bit(s) of computers and may also cause permanent destructive damage. The occurrence of SEEs are a matter of probability with each strike by an energetic particle. Prolonged radiation exposure, referred to as Total Ionizing Dose (TID), may also gradually alter the performance of electronic products. When the circuit receives a certain level of Total Ionizing Dose, the circuit will cease normal function and will eventually result in permanent failure.

A common class of SEEs is the Single Event Upset (as called SEU), wherein the SEU is a single high-energy particle applied on a semiconductor component, causing abnormal changes in the component's logic state. The SEU is the most common and typical among various SEEs caused by space radiation, primarily occurring in data storage or instruction-related components. The component errors caused by the SEU are considered "soft errors," which may be restored to normal condition through system reset, re-powering, or rewriting. However, SEUs can cause data corruption, anomalous software state transitions, or software hangs and crashes.

Another common class of SEEs is the Single-Event Latch-up (SEL), a phenomenon where a single high-energy particle penetrates the semiconductor structure, causing its parasitic structure to mutate, resulting in a low impendence state and overcurrent, and potentially permanently lose its function if not power cycled promptly. This primarily affects CMOS components, for example, a silicon-controlled rectifier originally with a PNPN four-layer structure, where a single charged particle induces a transient current, triggering the silicon structure to conduct, breaking down into a stacked PNP transistor and NPN transistor. A single-event latch-up can potentially cause irreparable damage to electronic components. Unlike the SEU, it is considered a "hard error" that causes physical hardware damage, making repairs in space even more challenging, thus posing a significant challenge for space radiation detection.

Therefore, both astronauts and electronic components are affected by high-energy radiation from deep space environments. Consequently, providing a radiation sensor with capable of tolerating and recovering from SELs, SEU, and TID for use in the deep space environments is a challenging problem that technical experts in this field seek to solve.

SUMMARY OF THE INVENTION

An objective of the present application is to provide a radiation sensor for use in deep space environments, which is capable of operating under conditions of high-intensity radiation, high-energy particles, extreme temperatures, severe vibrations and mechanical loads, while being capable of making measurements of ionizing radiation dose, dose rate, and single event upset count in deep space, while also being tolerant of SEUs and single-event latch-ups.

To achieve the aforementioned objectives, the present application provides a radiation sensor for a deep space environment, comprising a circuit board, a payload control module disposed on the circuit board, a radiation sensitive field-effect transistor readout module disposed on the circuit board and electrically connected to the payload control module, and a flash memory integrated circuit (IC) disposed on the circuit board and electrically connected to both the payload control module and the radiation sensitive field-effect transistor readout module. The flash memory includes a detection software. Wherein the flash memory stores sensor data under an ionizing radiation environment from 0 to 100,000 rads, and meets at least one bit flip based on SEU. The detection software instantly detects and records a position of the bit in the flash memory where the SEU is occurred, resets the data occurring the SEU, and records a bit quantity of bit errors. By sweeping and resetting the bits affected by SEUs, the detection software is configured to sense the effects of cosmic ray heavy ions or solar energetic particles on flash memory and related computer memory, which may be referenced for a future spacecraft avionics design.

The present application provides an embodiment, further includes a chassis disposed around the outside of the circuit board, with one side of the chassis including a through hole and a first hollowed-out part adjacent to the through hole; a front plate member disposed on the chassis, which has a second hollowed-out part; and at least one fixed member, disposed between the front plate member and the circuit board, configured to secure the circuit board and space the circuit board and the front plate member by a fixed distance.

The present application provides an embodiment, which further includes a plurality of thermal insulation collars, disposed on the front plate member.

The present application provides an embodiment, further including an electrical interface, disposed on the circuit board to electrically connect the payload control module and the radiation sensitive field-effect transistor readout module; and a data interface, disposed on the circuit board electrically connecting the payload control module and the radiation sensitive field-effect transistor readout module.

The present application provides an embodiment, wherein the electrical interface further includes a transformer, which is electrically connected to the payload control module; a first electronic fuse, which is electrically connected to the radiation sensitive field-effect transistor readout module; and a second electronic fuse, which is electrically connected to the transformer. Wherein, radiation sensitive field-effect transistor readout module if the ionizing radiation environment generates a single-event latch-up, it is cleared by power cycling using either the first or second electronic fuse.

The present application provides an embodiment, wherein the first electronic fuse is electrically connected to a first input power source, and the second electronic fuse is electrically connected to a second input power source.

The present application provides an embodiment, where the circuit board is correspondingly disposed in an aircraft, a rocket, or an artificial satellite.

The present application provides an embodiment, wherein the front plate member is correspondingly disposed on a surface of an aircraft, a rocket, or an artificial satellite.

The present application provides an embodiment that includes a multi-layer insulation member, which are disposed on the exterior of the chassis and encircle the chassis, configured for temperature regulation.

The present application provides an embodiment where the top plate of the chassis is coated with a UV-resistant white coating to serve as a heat radiating front plate member.

To this end, a radiation sensor for use in deep space environments is provided, solving a problem desired to be solved by the skilled one in the space sciences.

DETAILED DESCRIPTION OF THE INVENTION

In order to provide the esteemed reviewers with a further understanding and recognition of the features and effects achieved by the present application, a preferred embodiment is presented along with a detailed description as follows:

Due to the deep space environment being filled with high-energy mixed space radiation fields, detecting radiation doses is an important part of deep space exploration or detection. However, high-energy radiation may cause errors in electronic components and prevent the radiation sensor from accurately measuring the radiation doses in deep space. Incorrect radiation doses may easily lead to erroneous judgments by astronauts or central control computers, thereby posing a danger to astronauts or spacecraft.

The radiation sensor of the present application, applied in the deep space environment, is not only capable of handling high-intensity radiation, high-energy particles, extreme temperatures, and intense vibrations but also capable of detecting and repairing SEUs in electronic components while measuring radiation doses. This prevents accidents caused by incorrect radiation dose measurements or control sequence corruption due to SEUs in the deep space environment.

In the following text, various embodiments of the present application will be described in detail through diagrams. However, the concepts of the present application may be embodied in many different forms and should not be construed as limited to the exemplary embodiments set forth herein.

Figure 1:
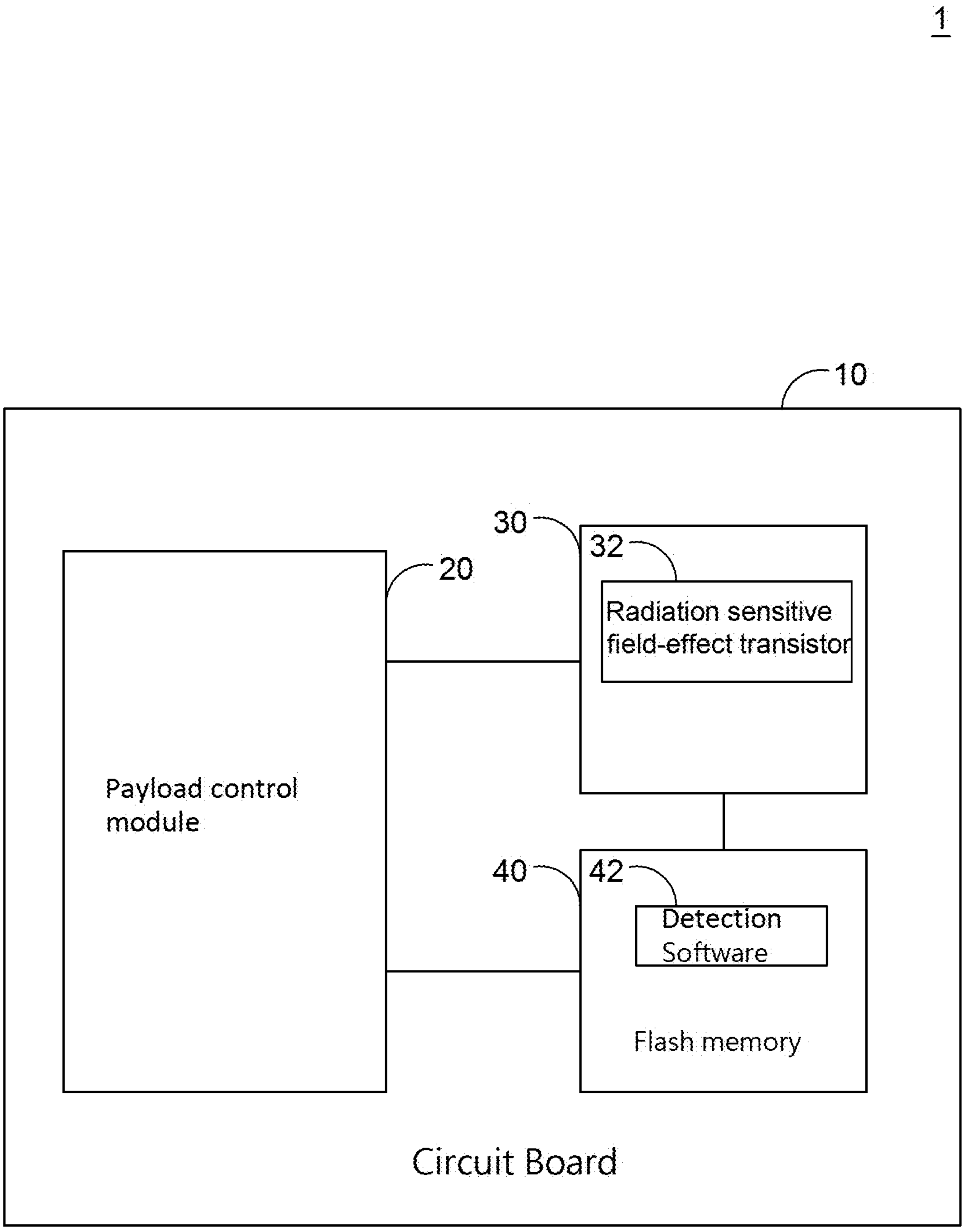
FIG. 1 which is a block diagram of an embodiment of the present application.

First, the circuit part of the present application will be described. Please refer to FIG. 1, which is a block diagram of an embodiment of the present application, as shown in the figure. Subsequently, a detailed description will be given of a radiation sensor 1 for deep space environments, comprising a circuit board 10; a payload control module 20 disposed on the circuit board 10; a radiation sensitive field-effect transistor readout module 30 disposed on the circuit board 10 and electrically connected to the payload control module 20; and a flash memory 40 disposed on the circuit board 10 and electrically connected to both the payload control module 20 and the radiation sensitive field-effect transistor readout module 30, the flash memory 40 also includes a detection software 42, wherein the sensing data stored in the flash memory, under a higher ionizing radiation environment ranging from 0 to 100,000 rads, at least one bit of the sensing data undergoes a SEU, and the detection software 42 instantly detects and records the position of the bit in the flash memory 40 where the SEU occurred, the detection software 42 resets the data where the SEU occurred and records the number of bit errors.

Continued to above, the present application senses radiation in deep space environments through the radiation sensitive field-effect transistor readout module 30, wherein the radiation sensitive field-effect transistor readout module 30 includes a radiation sensing field-effect transistor 32, the radiation sensing field-effect transistor 32 is a P-channel MOSFET optimized for radiation sensitivity, the radiation sensing field-effect transistor 32 is specially designed to be sensitive to high-energy (ionizing) radiation, and it exhibits different threshold voltages depending on the dose of ionizing radiation, allowing the absorbed radiation dose to be inferred from its threshold voltage, the present application involves recording the voltage of this type of microelectronic chip at specified time intervals and calculating the ionizing radiation dose from the recorded threshold voltage, the method of calculation may be refined by comparing the recorded voltage with calibration data obtained under simulated laboratory conditions, thereby estimating the ionizing radiation dose, but is not limited to this method.

Continued to above, the present application utilizes the detection software 42 within the flash memory 40 to sense SEUs, while simultaneously using the flash memory 40 for data storage. The flash memory 40 not only has superior dynamic shock resistance, preventing data loss from severe shaking, but also when made into a memory card, it is extremely robust and may withstand high pressure and extreme temperatures. Additionally, as a non-volatile solid-state storage, it does not consume power during file storage, offering numerous advantages for deep space exploration.

However, even without the influence of ionizing radiation, data retention errors and interference with read/write operations may cause inaccuracies in the flash memory 40. Therefore, it is necessary to regularly perform error detection and correction on the flash memory 40. For the flash memory 40, one correction and two error detections per word are deemed sufficient.

Continued to above, in addition to its data storage capabilities, the flash memory 40, when exposed to high ionizing radiation in space, meets SEUs due to cosmic ray heavy ions or solar energetic particles. Consequently, the detection software 42 within the flash memory 40 promptly detects and records the location of the bit affected by the SEU. The detection software 42 resets the data affected by the SEU and records the number of bit errors.

Continued to above, the present application controls the payload through the payload control module 20. When the payload control module 20 is activated, the payload enters scientific mode, regularly generating and recording a plurality of management data packets. The packets include the health status data of the payload and the last recorded scientific data. The health status data corresponds to whether there are errors in the software of the payload control module 20, while the scientific data corresponds to the voltage changes detected by the radiation sensor field-effect transistor 32 and the number of SEUs detected by the detection software 42 in the flash memory 40.

Figure 2:
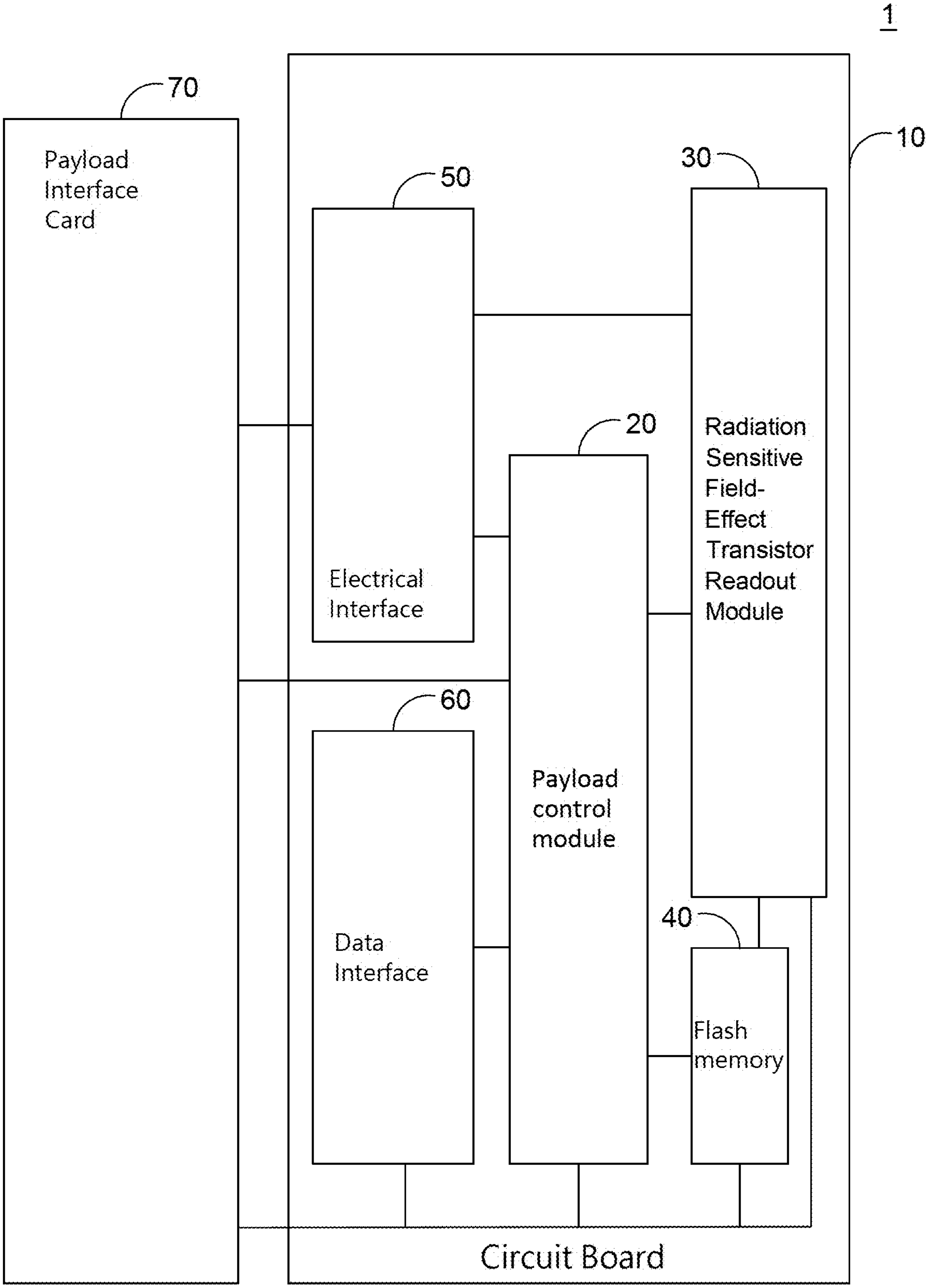
FIG. 2 which is a system block diagram of an embodiment of the present application.

Please refer to FIG. 2, which is a system block diagram of an embodiment of the present application. As shown in the figure, the present application is applied to a radiation sensor 1 in a deep space environment, which further includes an electrical interface 50 disposed on the circuit board 10 and electrically connected to the payload control module 20 and the radiation sensitive field-effect transistor readout module 30; and a data interface 60 disposed on the circuit board 10 and electrically connected to the payload control module 20 and the radiation sensitive field-effect transistor readout module 30.

Continued to the above, the electrical interface 50 further includes a transformer 52, which is electrically connected to the payload control module 20; a first electronic fuse 54, which is electrically connected to the radiation sensitive field-effect transistor readout module 30; and a second electronic fuse 56, which is electrically connected to the transformer 52; where the first electronic fuse 54 and the second electronic fuse 56 are configured to restore an SEL.

Continued to the above, the present application provides a mechanism for autonomous recovery of SELs through the first electronic fuse 54 and the second electronic fuse 56. SELs cause high currents in electronic components, leading to their failure, which may only be cleared by restarting the power supply. Therefore, when the first electronic fuse 54 or the second electronic fuse 56 detects excessive current, it will temporarily disconnect the power supply to facilitate a power restart to recover from the SEL.

Continued to the above, when applied in spacecraft, rockets, or artificial satellites, the radiation sensor 1 of the present application connects to an external payload interface card 70 of the spacecraft, rocket, or artificial satellite. The data interface 60 of the present application is configured to convert the data protocol of the payload control module 20 to that of the external payload interface card 70, allowing data to be transferred between the payload control module 20 and the external payload interface card 70.

Continued to the above, the radiation sensor 1 of the present application, when configured in a deep space environment, may be disposed in a spacecraft, rockets, or artificial satellites and interconnected with their own systems to achieve the effect of radiation sensing.

In this embodiment, the data interface 60 consists of a transceiver integrated circuit (not shown in the figure) and an auxiliary circuit (not shown in the figure), but is not limited to this configuration.

Figure 3:
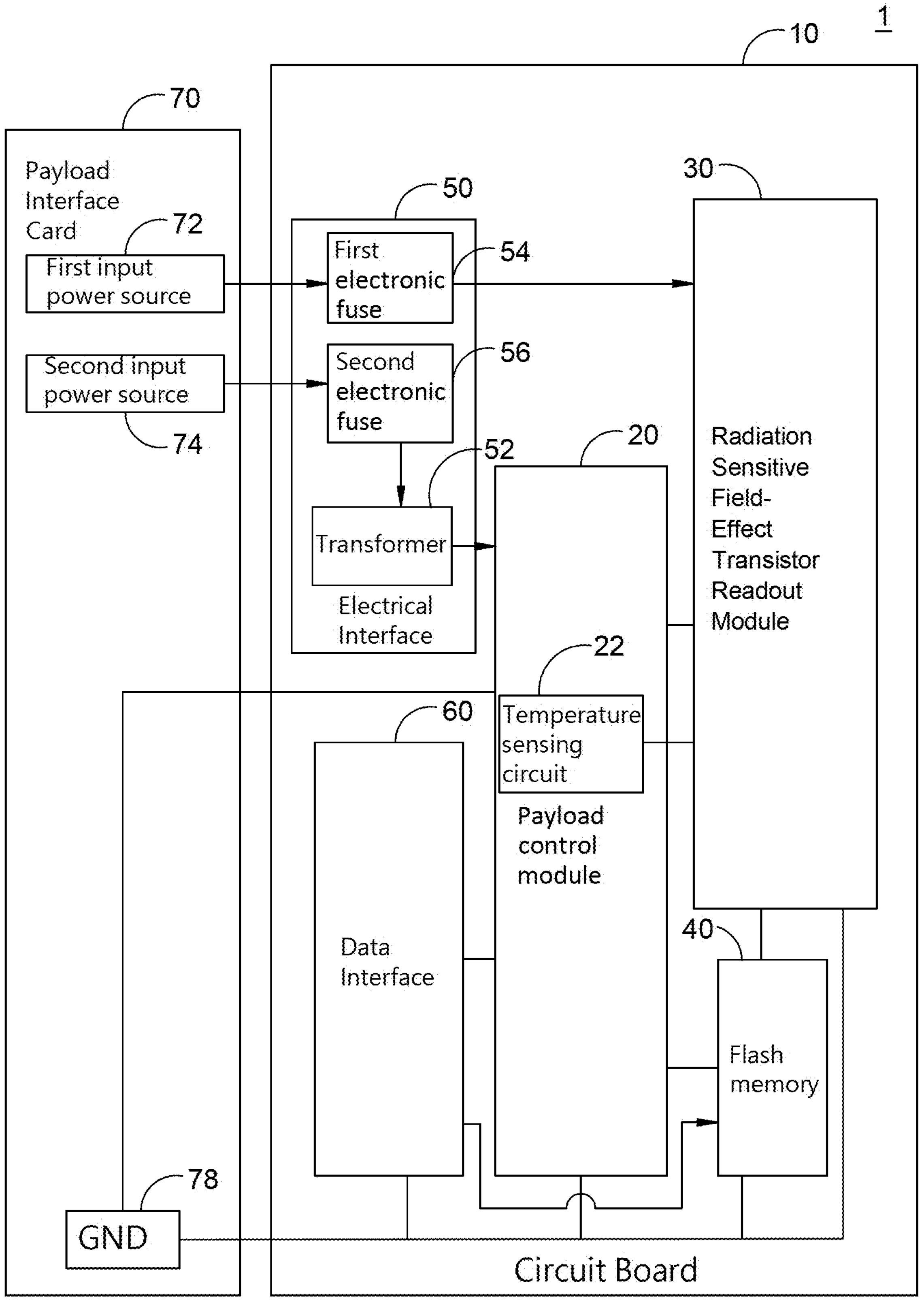
FIG. 3 which is a block diagram of an embodiment of the present application.

Continued to the above, please refer to FIG. 3, which is a schematic diagram of the external payload interface card of the present application. As shown in the figure, the radiation sensor 1 for the deep space environment of the present application is connected to the external payload interface card 70 of the spacecraft, rocket, or artificial satellite. The external payload interface card 70 further includes a first input power source 72, electrically connected to the first electronic fuse 54; a second input power source 74, electrically connected to the second electronic fuse 56; and a ground terminal 78, electrically connected to the data interface 60, the payload control module 20, the radiation sensitive field-effect transistor readout module 30, and the flash memory 40.

Continued to the above, the present application provides a mechanism for autonomous recovery from SELs through the first electronic fuse 54 and the second electronic fuse 56. SELs may cause high currents in electronic components, leading to their failure, which may only be cleared by power cycling. Therefore, when the first electronic fuse 54 or the second electronic fuse 56 detects excessive current, it will temporarily disconnect the first input power source 72 or the second input power source 74 to facilitate power cycling of the first input power source 72 or the second input power source 74 to recover from the SEL.

In this embodiment, the first input power source 72 is 12V, which is used as the power supply for the radiation sensitive field-effect transistor readout module 30. The required input voltage for the radiation sensitive field-effect transistor readout module 30 is 12V, thus eliminating the need for a transformer 52 to adjust the voltage. Meanwhile, the second input power source 74 is 5V, and through the transformer 52, the voltage of the second input power source 74 is adjusted to 3.3V, which is used as the power supply for the payload control module 20. Here, 3.3V is the input voltage required by most electronic components in this embodiment, apart from the radiation sensitive field-effect transistor readout module 30, and this example does not specifically limit the input voltage of the components of the present application.

In this embodiment, when the first electronic fuse 54 or the second electronic fuse 56 detects excessive current, it will disconnect the 12V first input power source 72 or the 5V second input power source 74 to prevent the radiation sensor 1 for the deep space environment from being damaged or destroyed by the high overcurrent caused by SELs, thereby protecting the radiation sensor 1 for the deep space environment.

In this embodiment, the flash memory 40 is electrically connected to the data interface 60, enabling the data interface 60 to read or store the data stored in the flash memory 40 for future retrieval.

In this embodiment, the payload control module 20 additionally includes a temperature sensing circuit 22 to measure both its own and the radiation sensitive field-effect transistor readout module 30's temperatures, to prevent voltage fluctuations unrelated to radiation in the radiation sensitive field-effect transistor readout module 30.

Figure 4:
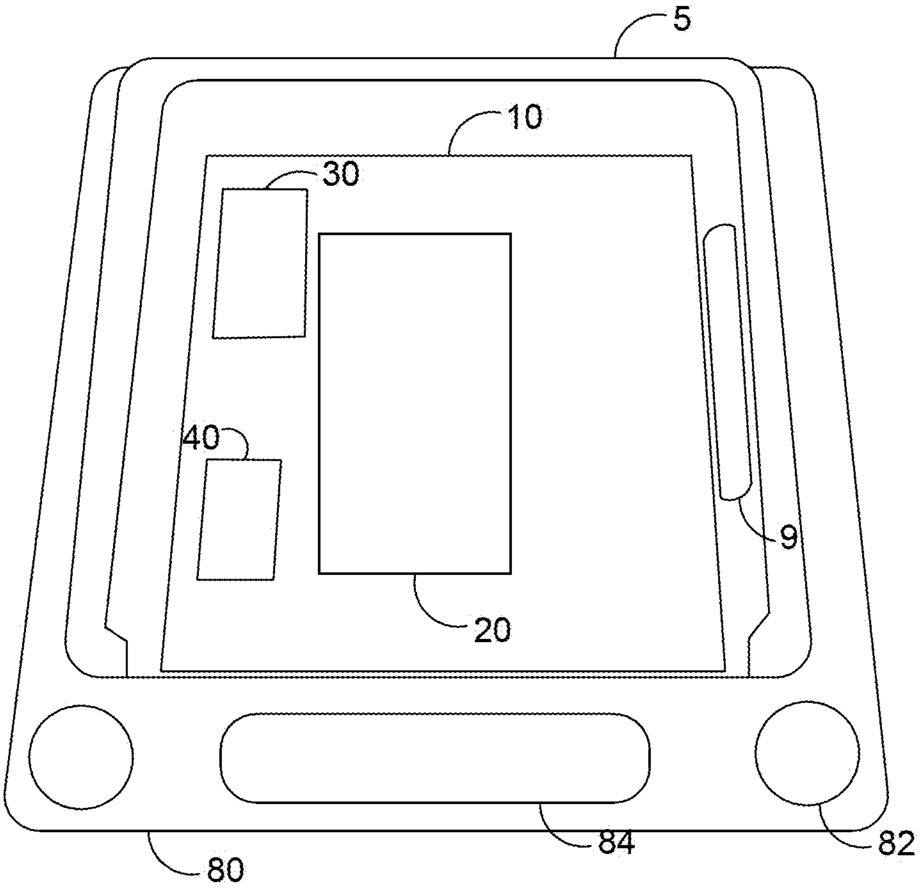
FIG. 4 which is a top view schematic of the present application.
Figure 5:
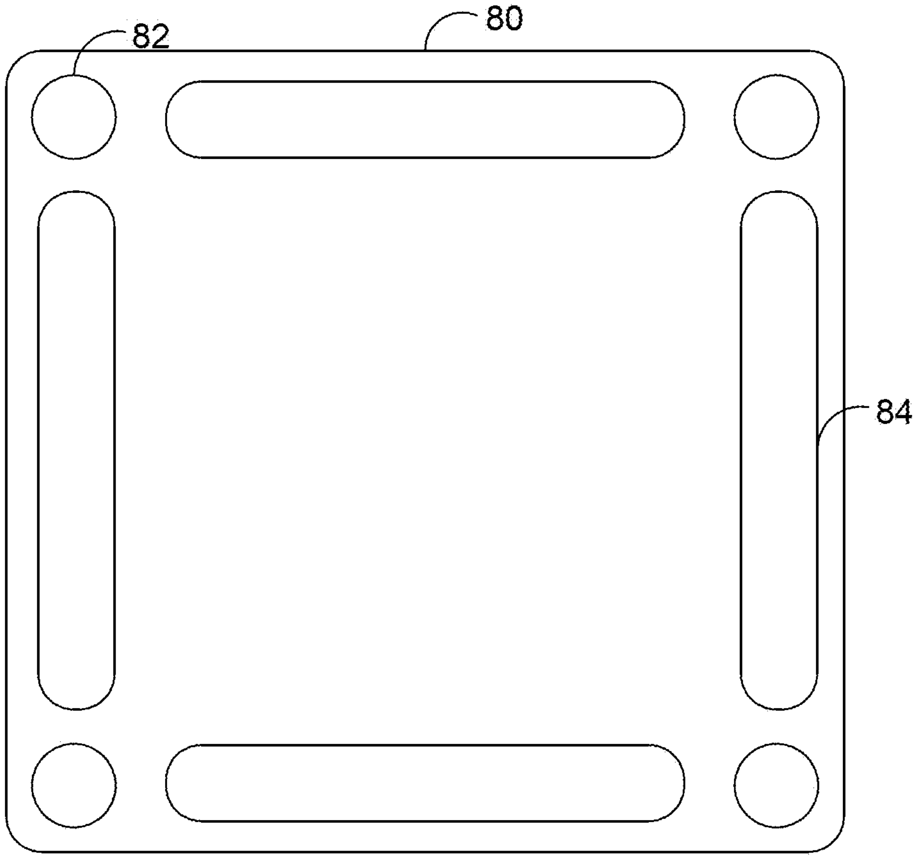
FIG. 5 which is a structural diagram of the front plate member of the present application.
Figure 6:
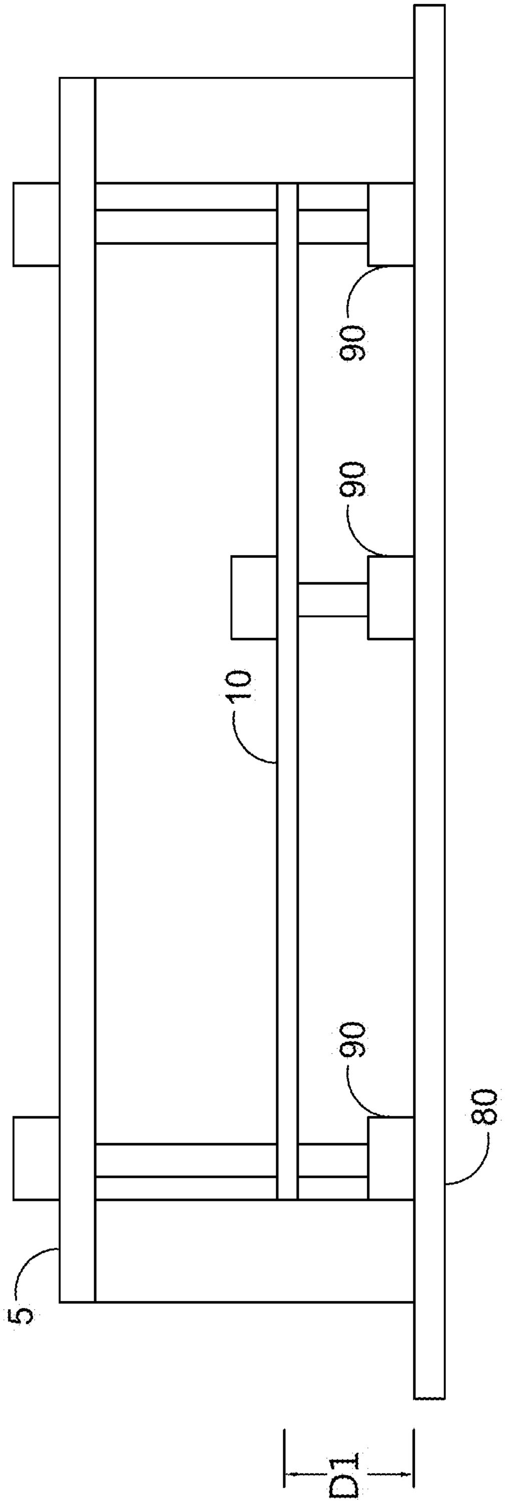
FIG. 6 which is a side view schematic of the present application.

The structural part of the present application will now be described, please refer to FIG. 4, FIG. 5, and FIG. 6. FIG. 4 is a top view schematic of the present application, FIG. 5 is a schematic of the board structure, and FIG. 6 is a side view schematic of the present application. As shown in the figures, the present application is applied to a radiation sensor 1 for deep space environments, which further includes a chassis 5 with a through hole on one side (not shown in the figure) and a first hollow section 9 adjacent to the through hole. A circuit board 10, which is disposed in the chassis 5. A payload control module 20, which is disposed on the circuit board 10. A radiation sensitive field-effect transistor readout module 30, which is disposed on the circuit board 10 and is electrically connected to the payload control module 20. And a flash memory 40, which is also disposed on the circuit board 10 and is electrically connected to both the payload control module 20 and the radiation sensitive field-effect transistor readout module 30. A front plate member 80, which is disposed on the chassis 5, and this front plate member 80 has a second hollow section 84. And at least one fixed member 90, which is placed between the front plate member 80 and the circuit board 10, and this at least one fixed member 90 is configured to secure the circuit board 10 and space the circuit board 10 and the front plate member 80 by a first distance D1. In which, the radiation sensitive field-effect transistor readout module 30 senses the radiation intensity in the higher ionizing radiation environment and causes a critical voltage increase. The flash memory 40 detects and records the critical voltage of the radiation sensitive field-effect transistor readout module 30. And the number of SEUs occurring in the flash memory 40. The flash memory 40 resets the data where the SEUs occurred. The present application protects the circuit board 10, the payload control module 20, the radiation sensitive field-effect transistor readout module 30, and the flash memory 40 by positioning the circuit board 10 inside the chassis 5. Simultaneously, the chassis 5 provides thermal insulation and vibration protection for the circuit board 10, the payload control module 20, the radiation sensitive field-effect transistor readout module 30, and the flash memory 40.

In this embodiment, since the radiation sensor 1 for deep space environment of the present application is directly exposed to space, it is necessary to ensure that all electronic components may maintain their temperature within the loadable range to prevent any electronic component from malfunctioning due to temperature changes. Additionally, it is essential to ensure that the total mass of the radiation sensor 1 for deep space environment does not exceed 400 grams and the total power consumption is less than 900 milliwatts. Regarding temperature, since the spacecraft has a side facing the sun and a side facing away from the sun, the side facing the sun will continue to heat up, and the side facing away from the sun will continue to cool, thus creating more extreme temperature differences.

Therefore, please refer back to FIG. 5, as shown in the figure, in this example, a front plate member 80 is disposed on the chassiss 5; and a plurality of thermal insulation collars 82 are disposed on the front plate member 80, which further reduce the low temperature effects conducted between the internal electronic components and the spacecraft through the installation of the thermal insulation collars 82.

Following the above, the radiation sensor 1 for deep space environment of the present application may be disposed on the outer surface of a spacecraft, rocket, or artificial satellite and interconnected with its own system to achieve the effect of the radiation sensor. Due to the harsh environment on the outer surface of the spacecraft, rocket, or artificial satellite, the chassis 5 and at least one fixing component 90 are configured to fix and protect the circuit board 10, to prevent physical damage and reduce the impact of vibration and temperature on the radiation sensor 1 for deep space environment.

Since the internal electronic components may not operate normally in environments below zero degrees Celsius, this embodiment further includes an external heater (not shown in the figure). When the temperature sensing circuit 22 detects a temperature below zero degrees Celsius, the external heater is activated to address the harsh low-temperature environment, allowing the internal electronic components to function properly.

Due to the need to withstand the vibrations caused by the launch and flight of the spacecraft, in this embodiment, the maximum static load factor required for the radiation sensor 1 for the deep space environment is 33 G on the Z-axis and 30 G on the XY plane, where G represents the acceleration due to gravity, 9.8 meters per second squared.

Due to the requirements of the spacecraft equipment regulations, in this embodiment, the radiation sensor 1 for deep space environments needs to weigh less than 400 grams. Therefore, referring to FIG. 4 and FIG. 5, in this embodiment, a plurality of first hollow sections 9 and a plurality of second hollow sections 84 are designed on the chassis 5 and the front plate member 80, and are fixed with several screws to provide mechanical load in the flight environment.

Subsequently, referring to FIG. 6, as shown in the figure, the radiation sensor 1 for deep space environments further includes at least one fixing component 90, which is disposed between the front plate member 80 and the circuit board 10. This at least one fixing component 90 is configured to secure the circuit board 10 and space the circuit board 10 and the front plate member 80 by a first distance D1, ensuring that the circuit board 10 does not directly contact the front plate member 80, and also serves as a thermal insulator.

Continued to above, the present application may also incorporate a multi-layer insulation member, which are placed on the exterior of the chassis 5 and encircle it. The multi-layer insulation member are configured to regulate temperature. In this embodiment, the multi-layer insulation member may also be stacked in a plurality of layers to enhance the temperature regulation effect, thereby preventing the electronic components from reaching their operational temperature due to excessively high or low temperatures, which could lead to the electronic components ceasing to function or becoming damaged.

Continued to above, the present application may also apply a white coating with a UV resistance on the surface of the chassis 5, which serves as a heat dissipater and as a heat radiation front plate member for the radiation sensor 1 in deep space environments. This helps prevent the electronic components from reaching their operational temperature due to excessively high or low temperatures, which could lead to the electronic components ceasing to function or becoming damaged.

Continued to the above, please refer to the following Table (1).

| Result in the present application | | SpaceX Rideshare Maximum Predicted Environment | |
|---|---|---|---|
| Band (Hz) | Power spectral density ($g^2$/Hz) | Band (Hz) | Power spectral density ($g^2$/Hz) |
| 20 | 0.026 | 20 | 0.01 |
| 20-50 | +6 dB/octave | 20-50 | +1.33 dB/octave |
| 50-800 | 0.16 | 50-700 | 0.015 |
| 800-2000 | −6 dB/octave | 700-800 | +15.63 dB/octave |
| 2000 | 0.026 | 800-925 | 0.03 |
| Overall GRMS | 14.1 g | 2000 | 0.00644 |

Figure 7:
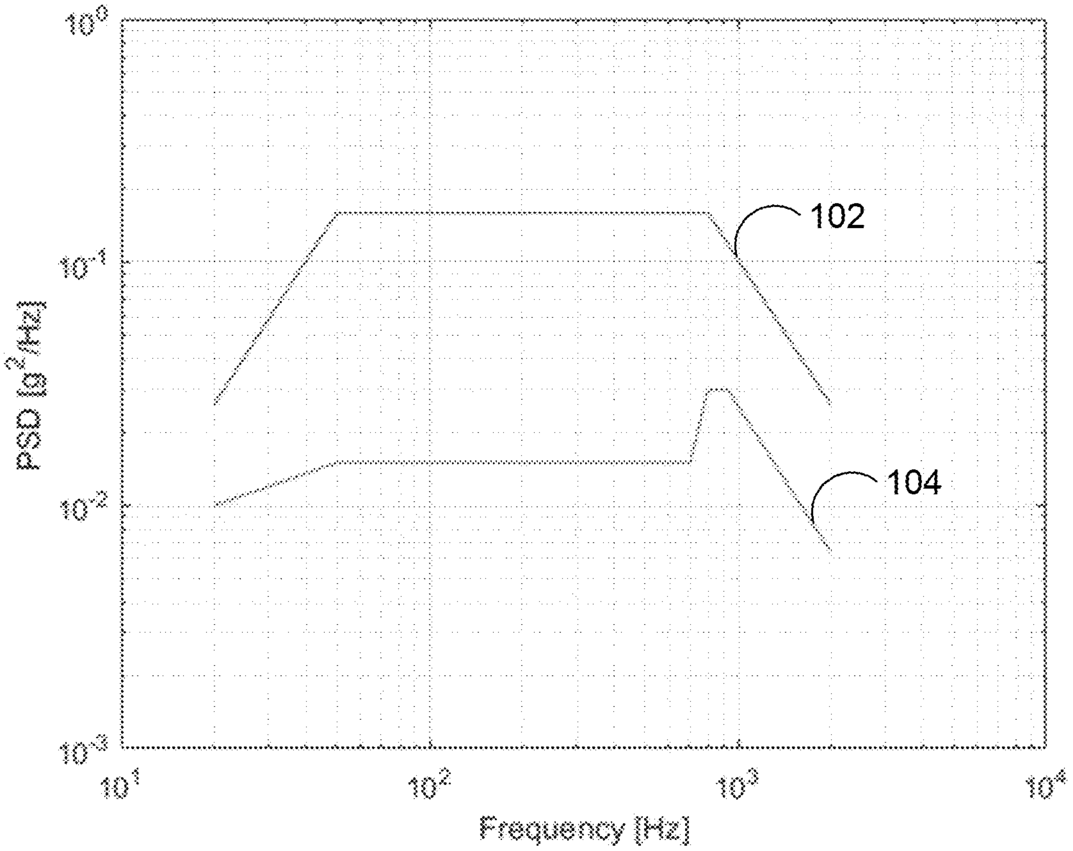
FIG. 7 which is a comparison chart of the random vibration power spectral density of the present application.

Please refer to Table (1) and FIG. 7, which are the comparison charts of random vibration power spectral density for the present application. The upper line segment 102 represents the random vibration power spectral density of the present application, and the lower line segment 104 is provided by SpaceX. It is observed that the maximum displacement of the present application is 3.76×10-2 millimeters, all within the maximum allowable range, thus proving that the radiation sensor 1 for deep space environment of the present application may withstand the vibrations produced during both launch and flight of the spacecraft.

Figure 8A:
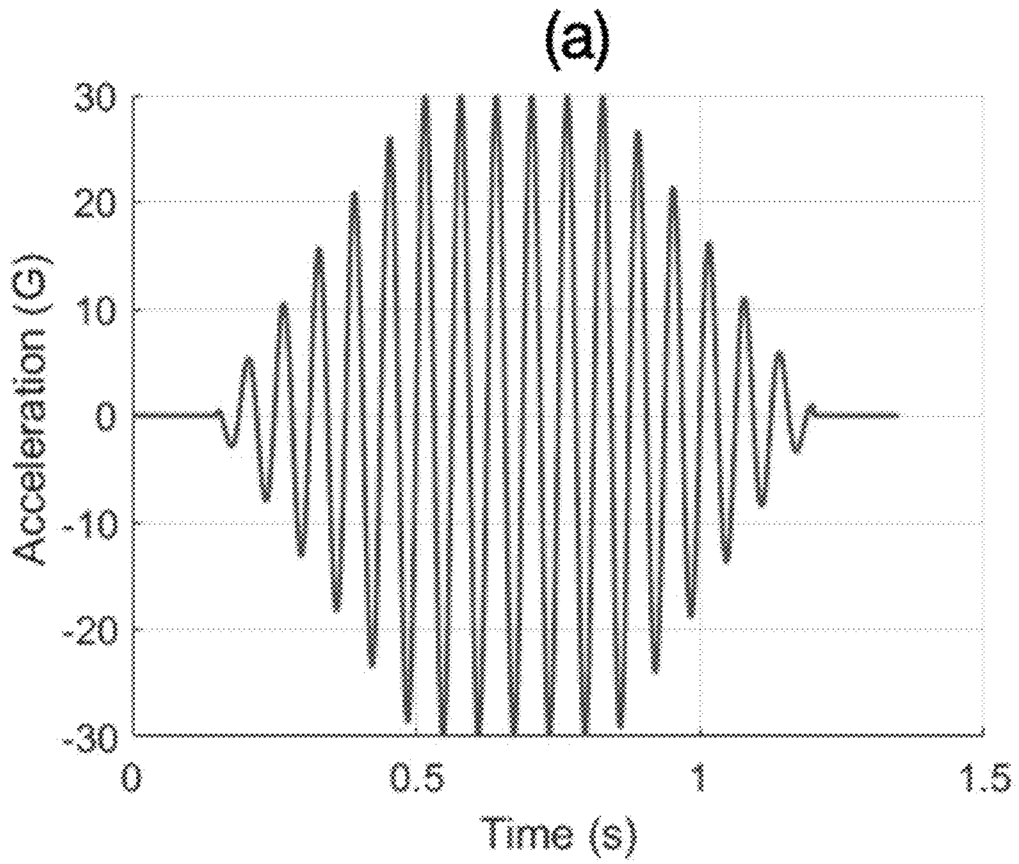
FIG. 8A which is a schematic diagram of the sine test for the X-axis and Y-axis of the present application.
Figure 8B:
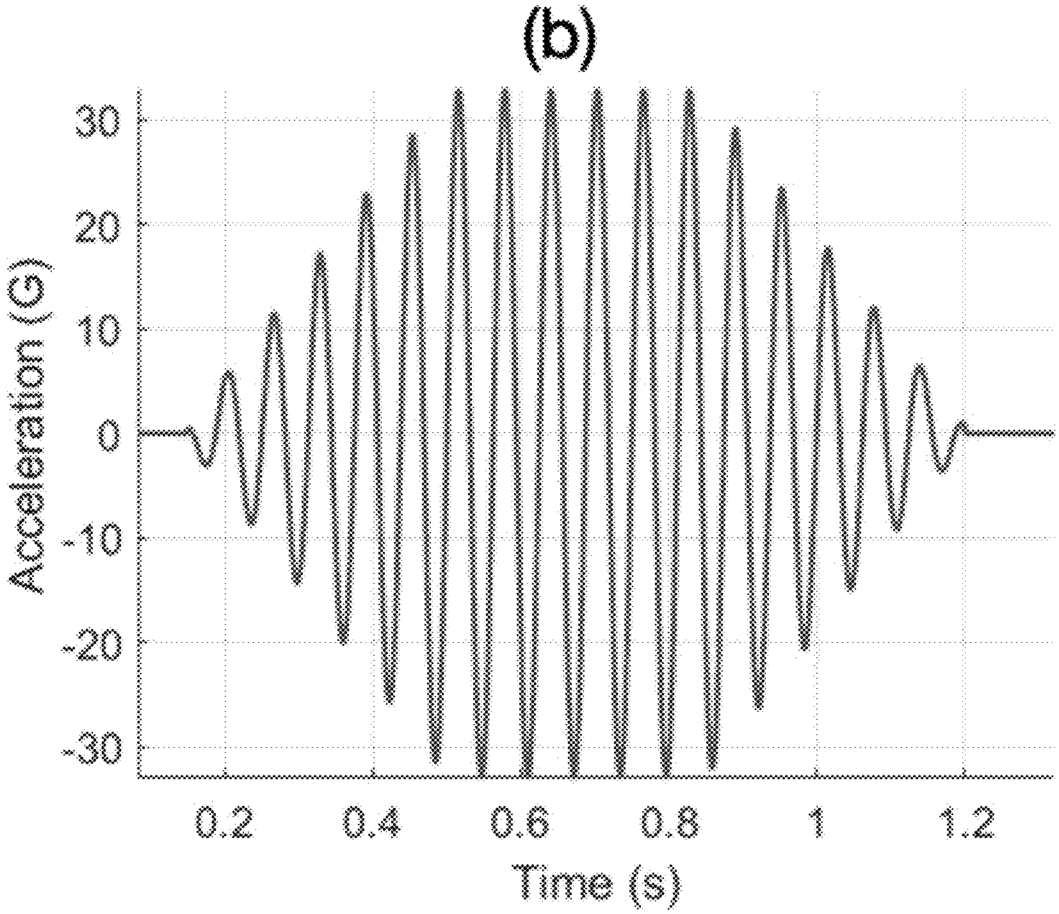
FIG. 8B which is a schematic diagram of the sine test for the Z-axis of the present application.

Please also refer to Table (1), FIG. 8A and FIG. 8B. FIG. 8A shows the sine test diagrams for the X and Y axes of the present application, and FIG. 8B shows the sine test diagram for the Z axis. As illustrated, a resonance check is conducted on the radiation sensor 1 for deep space environment of the present application. The sensor is fixed in different axial directions on the vibration table using fixtures, and sine vibrations as shown in FIG. 8A and FIG. 8B are performed. A sine test with an amplitude of 33 G along the XY plane and a test amplitude of 30 G along the Z axis are conducted. In this implementation, the radiation sensor 1 in the deep space environment underwent four different amplitude tests on three axes.

Continued to the above, after testing, the radiation sensor 1 for deep space environment of the present application was found to be 3 dB below the qualified specifications, and it passed the functional test after being powered on. The radiation sensor 1 for deep space environment of the present application may not only withstand the vibrations produced during launch or flight but also resist the mechanical stress encountered during flight, and it continues to operate normally after enduring such mechanical stress.

Figure 9:
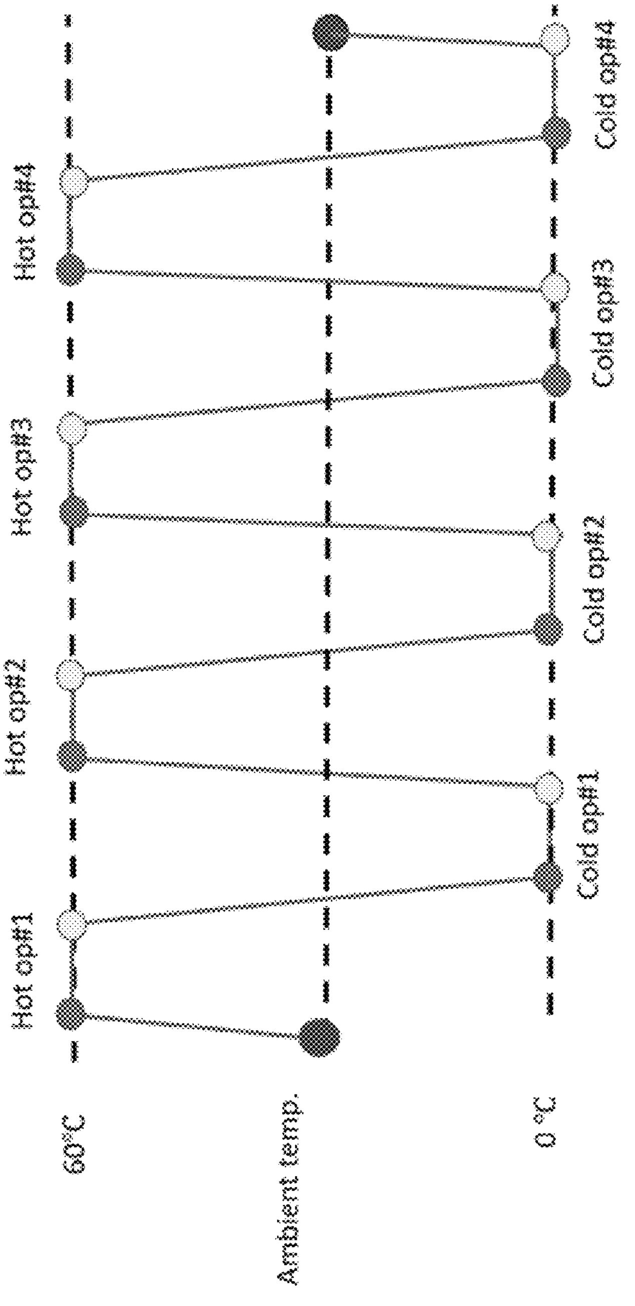
FIG. 9 which is a schematic diagram of the thermal test of the present application.

Continued to the above, please refer to FIG. 9, which is a schematic diagram of the thermal test of the present application. As shown in the figure, a temperature check is conducted on the radiation sensor 1 configured in deep space environments, focusing on the temperature-sensitive radiation sensing field-effect transistor 32. As illustrated, the test involves continuous hot soaking at 60 degrees Celsius for 4 hours and cold soaking at 0 degrees Celsius to perform thermal testing on the radiation sensing field-effect transistor 32. Functional tests are conducted before and after the soaking, which include transmitting and verifying a series of command executions involving telemetry requests and operational mode changes. During the hot and cold soaking periods, limited functional tests are performed, transmitting and verifying simplified commands, and every 30 seconds, a request command for those management data packets is sent to verify that its functionality remains intact.

The test results show that during the cooling phase, the radiation sensing field-effect transistor 32 exhibits sluggish response to commands and an abnormal increase in current. The anomalies only occur when the temperature approaches or is below the ambient temperature of the thermal vacuum chamber. It is necessary to turn off the power, increase the temperature, and then reconnect the power at room temperature to restore normal function.

Figure 10:
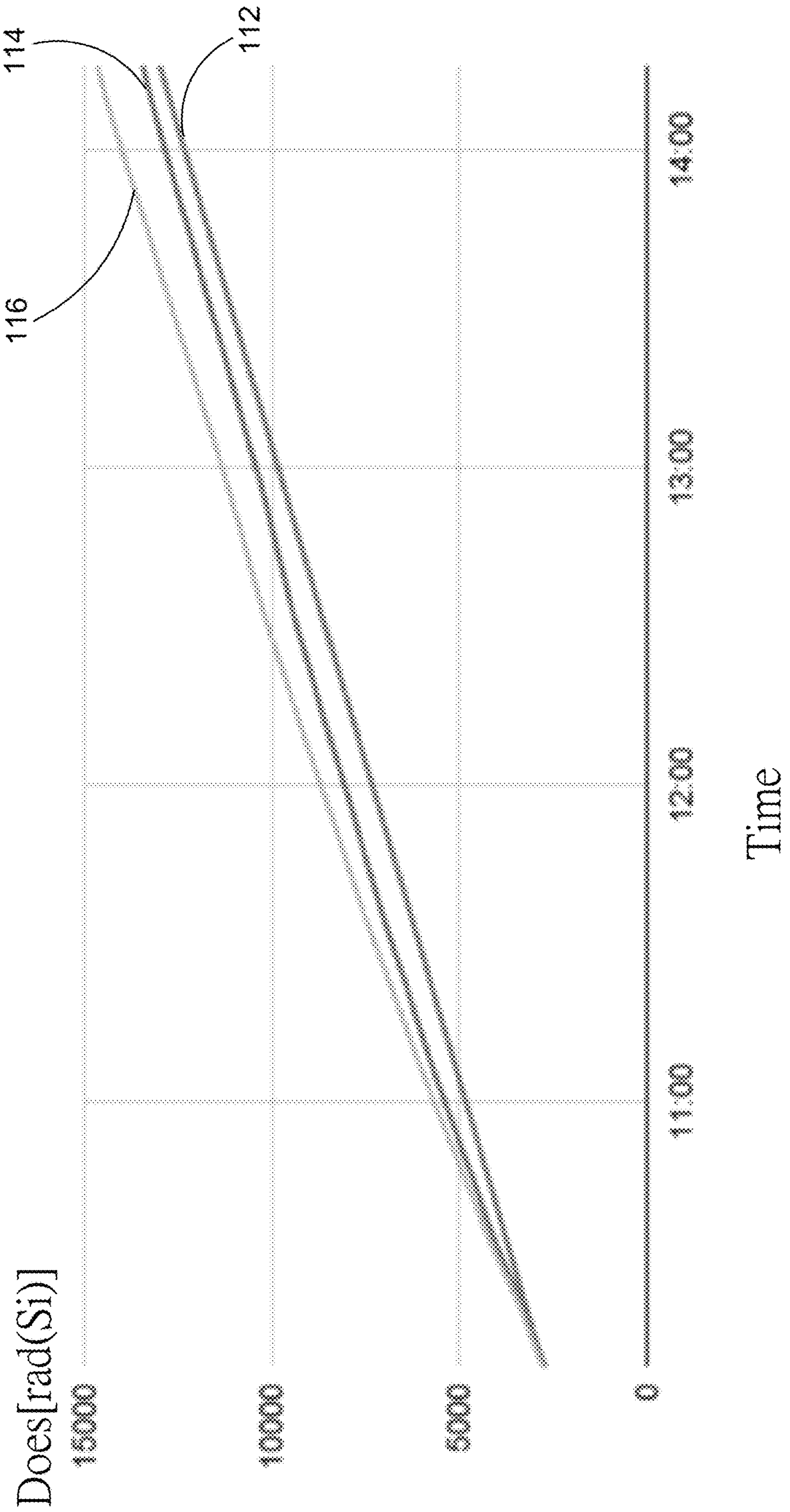
FIG. 10 which is a schematic diagram of the radiation test results of the present application.

Subsequently, as the present application requires radiation sensing between high-intensity radiations, the radiation sensitive field-effect transistor readout module 30 needs to withstand radiation of 10,000 rads through a 1 mm aluminum shield. Therefore, radiation tests are conducted on the radiation sensor 1 as configured for deep space environments. Please refer to FIG. 10, which is a schematic diagram of the radiation test results of the present application. As shown, the present application tests two sets of radiation sensitive field-effect transistor readout modules 30, designated as segments 114 and 116, with segment 112 as the standard radiation value. It is observed that the errors in segments 114 and 116 under radiation exposure are quite small, with a radiation dose of 10,168 rads in the radiation test. Thus, it is evident that the present application may still detect radiation accurately even under a radiation intensity of 10,000 rads, with minimal error.

Figure 11:
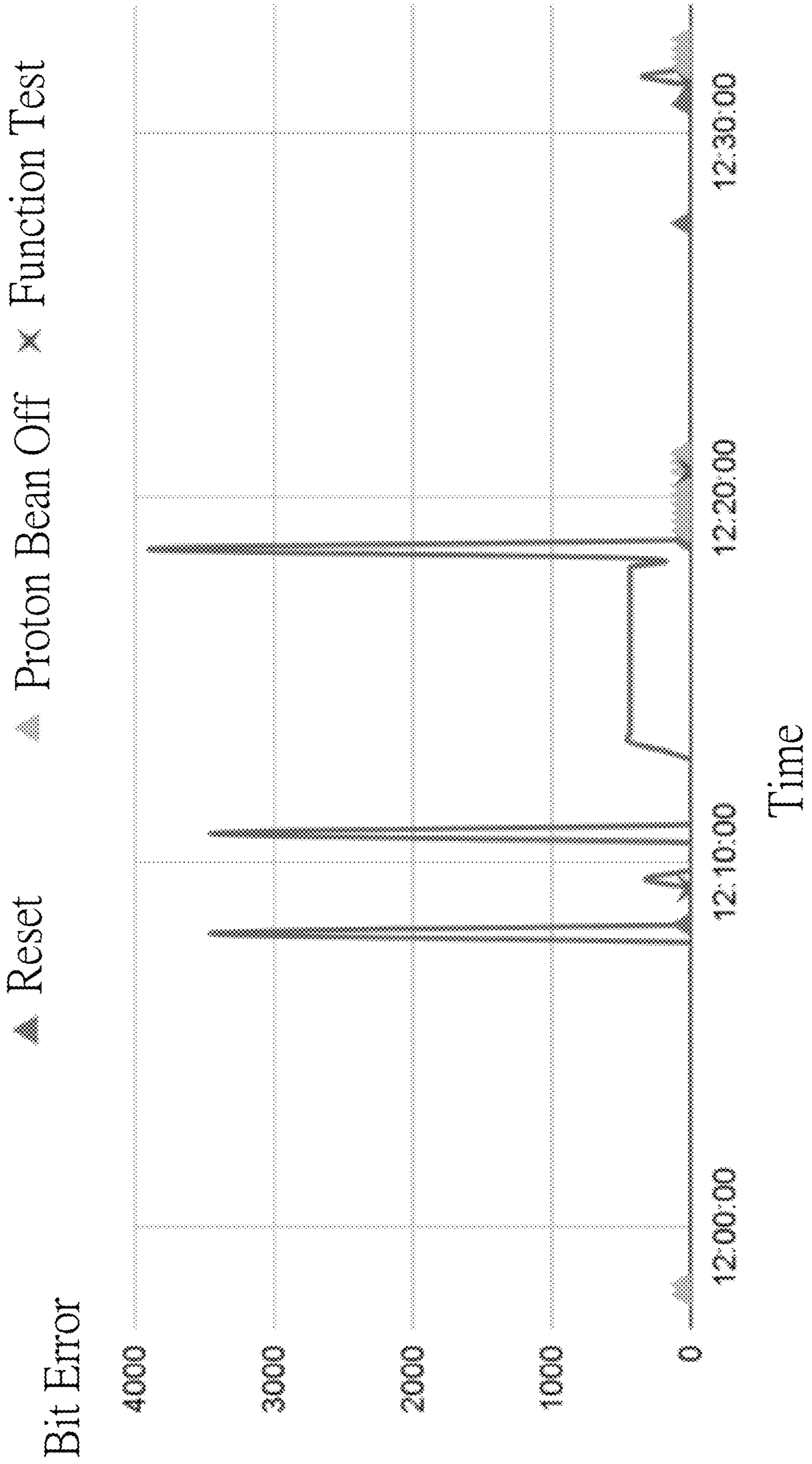
FIG. 11 which is a schematic diagram of the proton beam irradiation test results of the present application.

Subsequently, it is necessary to test whether the present application may withstand and resolve SEEs. Therefore, a proton beam generated by a cyclotron irradiates the radiation sensor 1 configured in deep space environments, as shown in FIG. 11, which is a schematic diagram of the proton beam irradiation test results of the present application. As illustrated, the DSRP value represents the number of bit errors produced by the irradiation of the proton beam, and the proton beam generated by the cyclotron has an average proton energy of about 221.2 MeV, an average proton flux of $1.32 \times 10^{7}$ cm2s-1, a test duration of 33 minutes, a proton beam flux of $2.37 \times 10^{10}$ cm-2, and a radiation dose of 1290 rads. During the test, there were no abnormal non-command recoveries or power cycles, indicating no occurrence of excessive current caused by single-event latch-up, thus proving that the radiation sensor 1 for the deep space environments may withstand proton impacts. A plurality of peaks may be observed, which are likely data errors caused by SEUs due to proton impacts, and these may also be resolved by the detection software 42 of the flash memory 40.

In the embodiment described above, the present application provides a radiation sensor for use in deep space environments. Through the detection software of the flash memory, it detects and repairs SEUs and logs radiation doses sensed by the radiation sensitive field-effect transistor readout module. a plurality of electronic fuses are configured to resolve excessive currents caused by single-event latch-ups. By utilizing a series of light-weighted parts, it reduces weight without affecting mechanical strength and uses the multi-layer insulation member for thermal insulation, enabling the radiation sensor to operate normally in extreme temperatures, strong vibrations, and excessive radiation environments, while remaining unaffected by SEEs, thus providing more reliable radiation sensing data for astronauts and space system engineers.

The invention claimed is:

1. A radiation sensor for deep space environments, comprising:

a circuit board;

a payload control module, disposed on the circuit board;

a radiation sensitive field-effect transistor readout module, disposed on the circuit board and electrically connected to the payload control module; and a flash memory, disposed on the circuit board and electrically connected to the payload control module and the radiation sensitive field-effect transistor readout module, including a detection software;

wherein, the flash memory stores a sensing data under an ionizing radiation environment from 0 rad to 100,000 rad, at least one bit of the sensing data occurs a single event upset, the detection software immediately detects and records a position of the bit occurring the single event upset in the flash memory, and the detection software resets the data occurring the single event upset and records a quantity of bit errors.

2. The radiation sensor for deep space environments of claim 1, further comprising:

a chassis, disposed around an outside of the circuit board, including a through hole located at a side and a first hollowed-out part set adjacent to the through hole;

a front plate member, disposed on the chassis, including a second hollowed-out part; and at least one fixed member, disposed between the front plate member and the circuit board, the at least one fixed member configured to secure the circuit board and space the circuit board and the front plate member by a first distance.

3. The radiation sensor for deep space environments of claim 2, further comprises:

a plurality of thermal insulation collars, disposed on the front plate member.

4. The radiation sensor for deep space environments of claim 2, wherein the front plate member is correspondingly disposed on a surface of an aircraft, a rocket, or an artificial satellite.

5. The radiation sensor for deep space environments of claim 1, further comprising:

an electrical interface, disposed on the circuit board and electrically connected to the payload control module and the radiation sensitive field-effect transistor readout module; and a data interface, disposed on the circuit board and electrically connected to the payload control module and the radiation sensitive field-effect transistor readout module.

6. The radiation sensor for deep space environments of claim 5, wherein the electrical interface further comprising:

a transformer, electrically connected to the payload control module;

a first electronic fuse, electrically connected to the radiation sensitive field-effect transistor readout module; and a second electronic fuse, electrically connected to the transformer;

wherein, the radiation sensitive field-effect transistor readout module senses the radiation dose due to the ionizing radiation environment and the first or second electronic fuse is configured to restore single event latchups due to the ionizing radiation environment through a power cycle.

7. The radiation sensor for deep space environments of claim 6, wherein the first electronic fuse is electrically connected to a first input power source, and the second electronic fuse is electrically connected to a second input power source.

8. The radiation sensor for deep space environments of claim 1, wherein the circuit board is correspondingly disposed in an aircraft, a rocket, or an artificial satellite.

9. The radiation sensor for deep space environments of claim 1, further comprising:

a multi-layer insulation member, covered on and surrounding an exterior of the chassis, the multi-layer insulation member configured to regulate a temperature in the chassis.

10. The radiation sensor for deep space environments of claim 1, wherein the chassis is coated by a white coating with an ultraviolet ray resistance at a surface thereof.

* * * * *